(12) United States Patent
Matsuda et al.

(10) Patent No.: US 11,592,203 B2
(45) Date of Patent: Feb. 28, 2023

(54) REFRIGERATION CYCLE APPARATUS

(71) Applicant: Mitsubishi Electric Corporation, Tokyo (JP)

(72) Inventors: Takuya Matsuda, Tokyo (JP); Shinichi Uchino, Tokyo (JP); Kaoru Hayashibara, Tokyo (JP); Nobu Iwata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 265 days.

(21) Appl. No.: 16/649,250

(22) PCT Filed: Sep. 26, 2017

(86) PCT No.: PCT/JP2017/034688
§ 371 (c)(1),
(2) Date: Mar. 20, 2020

(87) PCT Pub. No.: WO2019/064335
PCT Pub. Date: Apr. 4, 2019

(65) Prior Publication Data
US 2020/0300513 A1  Sep. 24, 2020

(51) Int. Cl.
*F24F 12/00* (2006.01)
*F25B 29/00* (2006.01)
(Continued)

(52) U.S. Cl.
CPC .......... *F24F 12/006* (2013.01); *F24F 5/0096* (2013.01); *F24F 7/08* (2013.01);
(Continued)

(58) Field of Classification Search
CPC .. F24D 17/001; F24D 2200/22; F24F 5/0069; F24F 7/08; F24F 11/46; F24F 12/003;
(Continued)

(56) References Cited

U.S. PATENT DOCUMENTS

| 4,071,080 A | * | 1/1978 | Bridgers ............... F24F 12/003 62/412 |
| 2007/0095519 A1 | | 5/2007 | Hombucher |

(Continued)

FOREIGN PATENT DOCUMENTS

| CN | 101672512 A | 3/2010 |
| DE | 103 23 287 A1 | 9/2004 |

(Continued)

OTHER PUBLICATIONS

Office Action dated May 11, 2021 issued in corresponding JP patent application No. 2019-545413 (and English translation).

(Continued)

*Primary Examiner* — Eric S Ruppert
*Assistant Examiner* — Hans R Weiland
(74) *Attorney, Agent, or Firm* — Posz Law Group, PLC

(57) ABSTRACT

A refrigeration cycle apparatus includes: a casing; an air handling unit accommodated in the casing and including a first duct and a first outlet, a second duct and a second outlet, a first fan and a second fan; and a refrigerant circuit configured to circulate refrigerant in the refrigerant circuit and including a first heat exchanger and a second heat exchanger.

9 Claims, 5 Drawing Sheets

(51) Int. Cl.

| | | |
|---|---|---|
| *F24F 7/08* | (2006.01) | |
| *F24F 11/46* | (2018.01) | |
| *F24F 13/30* | (2006.01) | |
| *F24F 5/00* | (2006.01) | |
| *F24F 7/00* | (2021.01) | |

(52) U.S. Cl.
CPC ............ *F24F 11/46* (2018.01); *F24F 12/003* (2013.01); *F24F 13/30* (2013.01); *F25B 29/003* (2013.01); *F24F 2007/001* (2013.01); *F24F 2012/007* (2013.01)

(58) Field of Classification Search
CPC .... F24F 12/006; F24F 13/30; F24F 2007/001; F24F 2012/007; F25B 29/003; Y02B 30/18; Y02B 30/52; Y02B 30/56
See application file for complete search history.

(56) References Cited

U.S. PATENT DOCUMENTS

| | | | | |
|---|---|---|---|---|
| 2011/0023517 | A1* | 2/2011 | Labaume | F24D 17/001 62/238.7 |
| 2013/0000882 | A1* | 1/2013 | Panula | F24F 12/006 165/287 |
| 2013/0333862 | A1* | 12/2013 | Yamashita | F25B 29/003 165/63 |
| 2017/0003036 | A1* | 1/2017 | Andersson | F24F 12/006 |

FOREIGN PATENT DOCUMENTS

| | | | |
|---|---|---|---|
| DE | 11 2014 000 527 | T5 | 10/2015 |
| DE | 11 2014 001 194 | T5 | 11/2015 |
| EP | 2 312 227 | A1 | 4/2011 |
| EP | 2489972 | A1 | 8/2012 |
| FR | 2 926 626 | A1 | 7/2009 |
| FR | 2 979 418 | A1 | 3/2013 |
| JP | H02-238234 | A | 9/1990 |
| JP | H06-213478 | A | 8/1994 |
| JP | 4799347 | B2 | 4/2008 |
| JP | 5455521 | B2 | 4/2011 |
| JP | 5474483 | B2 | 4/2011 |
| JP | 2014-152985 | A | 8/2014 |
| JP | 2015-190627 | A | 11/2015 |
| WO | 02/065026 | A1 | 8/2002 |
| WO | 2015/087423 | A1 | 6/2015 |

OTHER PUBLICATIONS

International Search Report of the International Searching Authority dated Dec. 12, 2017 for the corresponding International application No. PCT/JP2017/034688 (and English translation).

Extended European Search Report dated Aug. 20, 2020 issued in corresponding European patent application No. 17927210.9.

Office Action dated Nov. 17, 2022 issued in corresponding European Patent Application No. 17927210.9.

* cited by examiner

REFRIGERATION CYCLE APPARATUS

CROSS REFERENCE TO RELATED APPLICATION

This application is a U.S. national stage application of PCT/JP2017/034688 filed on Sep. 26, 2017, the contents of which are incorporated herein by reference.

TECHNICAL FIELD

The present disclosure relates to a refrigeration cycle apparatus, and particularly to a refrigeration cycle apparatus including a refrigerant circuit that circulates refrigerant in the refrigerant circuit, and having a function of supplying and discharging air.

BACKGROUND ART

Conventionally, a refrigeration cycle apparatus has been proposed in which a refrigerant circuit for adjusting an air temperature and a refrigerant circuit for supplying hot water are connected via an intermediate heat exchanger (see Patent Literature 1, for example).

CITATION LIST

Patent Literature

Patent Literature 1: Japanese Patent No. 5455521

SUMMARY OF INVENTION

Technical Problem

With the development of high-airtightness and high heat insulation of buildings, there may be cases where the ventilation load for exchanging indoor air with outdoor air is higher compared with the load on inner conditioning, where indoor air is conditioned. Accordingly, there is a problem that COP (Coefficient of performance) drops if a refrigerant cycle apparatus is configured without taking into account the increase in ventilation load.

The refrigeration cycle apparatus of the present disclosure has been made to overcome the above-mentioned problem, and aims to provide a refrigeration cycle apparatus that can further improve COP.

Solution to Problem

A refrigeration cycle apparatus of an embodiment of the present disclosure includes: a casing; an air handling unit accommodated in the casing, the air handling unit including a first duct having a first inlet communicating with an outdoor space, and a first outlet communicating with an indoor space, a second duct having a second inlet communicating with the indoor space, and a second outlet communicating with the outdoor space, a first fan configured to force air to move from the first inlet to the first outlet through the first duct, and a second fan configured to force air to move from the second inlet to the second outlet through the second duct; and a refrigerant circuit configured to circulate refrigerant in the refrigerant circuit and including a first heat exchanger configured to cause the refrigerant to condense by exchanging heat between the refrigerant and a heat medium, and a second heat exchanger disposed at the second duct and configured to cause the refrigerant to evaporate by exchanging heat between the refrigerant and the air moving through the second duct.

Advantageous Effects of Invention

The refrigeration cycle apparatus according to an embodiment of the present disclosure has the above-mentioned configuration and hence, COP can be further improved.

DESCRIPTION OF EMBODIMENTS

Figure 1:
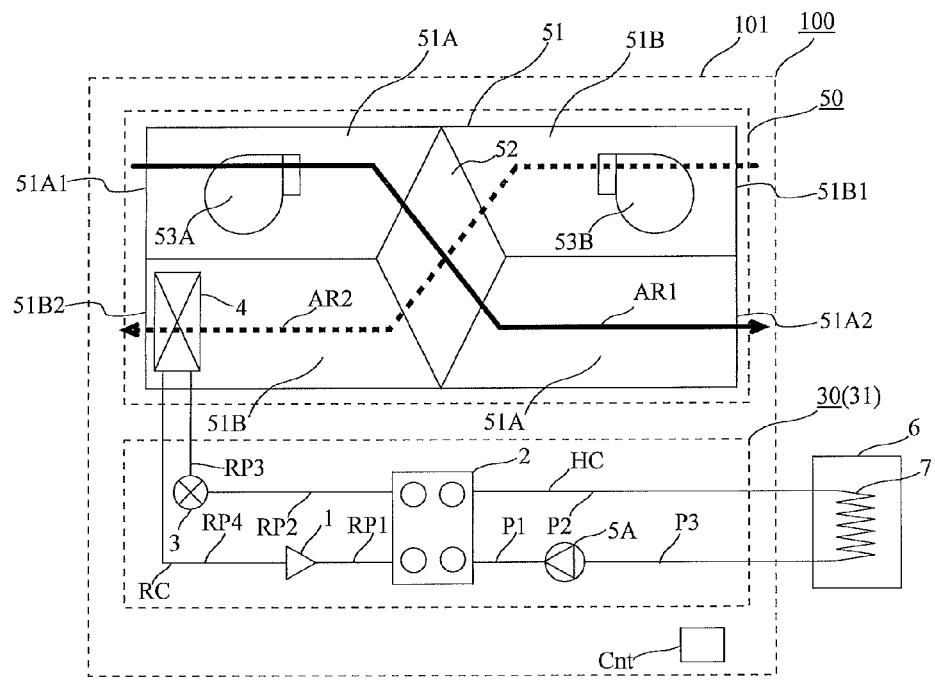
FIG. 1 is a schematic configuration view of a refrigeration cycle apparatus 100 according to Embodiment 1 of the present disclosure.

Embodiments of the present disclosure will be described hereinafter with reference to the drawings when necessary. Note that, in the following drawings, including FIG. 1, the size relationship between respective constituent members may differ from that of the actual ones. Further, in the following drawings, including FIG. 1, parts given the same reference numeral denote identical or corresponding parts, and the same applies to the entire specification. Further, forms or modes of the constituent elements described in the entire specification are merely for the sake of example, and are not limited to such descriptions.

Embodiment 1

FIG. 1 is a schematic configuration view of a refrigeration cycle apparatus 100 according to this embodiment 1. In FIG. 1, each of a supply air flow AR1 and an exhaust air flow AR2 is indicated by an arrow. The configuration of the refrigeration cycle apparatus 100 will be described with reference to FIG. 1.

[Description of Overall Configuration]

The refrigeration cycle apparatus 100 includes an air handling unit 50 (air-conditioning apparatus), a refrigerant circuit RC, and a part of a heat medium circuit HC. The refrigeration cycle apparatus 100 also includes a controller Cnt that controls a compressor 1 and other devices. The heat medium circuit HC includes a first heat exchanger 2, a first heat medium pipe P1, a second heat medium pipe P2, a third heat medium pipe P3, and a fourth heat exchanger 7, which will be described later. The part of the heat medium circuit HC indicates, as shown in FIG. 1, the first heat exchanger 2, the first heat medium pipe P1, a part of the second heat medium pipe P2, and a part of the third heat medium pipe P3.

The refrigeration cycle apparatus 100 includes a first casing 101. The first casing 101 is provided with the air handling unit 50, the refrigerant circuit RC, the part of the heat medium circuit HC, and the controller Cnt.

In this embodiment 1, a mode where the air handling unit 50 and the refrigerant circuit RC are accommodated in the first casing 101 will be described as one example. Further, in this embodiment 1, a mode where the part of the heat medium circuit HC and the controller Cnt are accommodated in the first casing 101 will be described as one example.

Note that the entire air handling unit 50 is not necessarily accommodated in the first casing 101. That is, a part of the air handling unit 50 may be exposed from the first casing 101.

The entire refrigerant circuit RC is not necessarily accommodated in the first casing 101. That is, a part of the refrigerant circuit RC may be exposed from the first casing 101.

The entire heat medium circuit HC is not necessarily accommodated in the first casing 101. That is, a part of the heat medium circuit HC may be exposed from the first casing 101.

Further, the controller Cnt may be provided in the first casing 101, or may be provided outside the first casing 101.

The refrigeration cycle apparatus 100 includes a machine chamber unit 30. The machine chamber unit 30 includes a second casing 31. The part of the refrigerant circuit RC and the part of the heat medium circuit HC are accommodated in the second casing 31. Specifically, the compressor 1, the first heat exchanger 2, an expansion valve 3, and a first pump 5A are accommodated in the second casing 31.

In the refrigeration cycle apparatus 100, the air handling unit 50 and the machine chamber unit 30 are accommodated in the first casing 101. The refrigeration cycle apparatus 100 is a refrigeration cycle apparatus where the air handling unit 50 and the machine chamber unit 30 are formed into an integral body. Accordingly, the refrigeration cycle apparatus 100 has a compact shape.

[Air Handling Unit 50]

The air handling unit 50 includes a third casing 51 accommodated in the first casing 101. The air handling unit 50 includes a first duct 51A, a second duct 51B, a first fan 53A, and a second fan 53B. The first duct 51A has a first inlet 51A1 communicating with an outdoor space, and a first outlet 51A2 communicating with an indoor space. The second duct 51B has a second inlet 51B1 communicating with the indoor space, and a second outlet 51B2 communicating with the outdoor space. The first fan 53A forces air (supply air) to move from the first inlet 51A1 to the first outlet 51A2 through the first duct 51A. The second fan 53B forces air (exhaust air) to move from the second inlet 51B1 to the second outlet 51B2 through the second duct 51B. The first duct 51A is a supply air duct through which supply air moves, and the second duct 51B is an exhaust air duct through which exhaust air moves. The first fan 53A is a supply air fan that forces supply air to move, and the second fan 53B is an exhaust air fan that forces exhaust air to move. A sirocco fan may be adopted for the first fan 53A and the second fan 53B, for example.

The air handling unit 50 also includes a third heat exchanger 52 connected to the first duct 51A and the second duct 51B. The third heat exchanger 52 performs total enthalpy heat exchange between supply air moving through the first duct 51A and exhaust air moving through the second duct 51B. Note that the third heat exchanger 52 is not necessarily provided to the air handling unit 50. Further, the third heat exchanger 52 of the air handling unit 50 may not be configured to perform total enthalpy heat exchange, but may be configured to perform heat exchange.

The first duct 51A and the second duct 51B are formed on the third casing 51. Further, the first fan 53A and the second fan 53B are mounted on the third casing 51. The air handling unit 50 may be configured such that the first fan 53A and the second fan 53B are disposed outside the third casing 51.

The first duct 51A has the first inlet 51A1 at a position on the first duct 51A on the most upstream side in the direction of an air flow, and has the first outlet 51A2 at a position on the first duct 51A on the most downstream side in the direction of the air flow. The first inlet 51A1 is connected to a duct communicating with an outdoor space, for example, and the first outlet 51A2 is connected to a duct communicating with an indoor space, for example. With such a configuration, outside air (supply air) taken into the air handling unit 50 can be supplied to the indoor space.

The second duct 51B has the second inlet 51B1 at a position on the second duct 51B on the most upstream side in the direction of an air flow, and has the second outlet 51B2 at a position on the second duct 51B on the most downstream side in the direction of the air flow. The second inlet 51B1 is connected to a duct communicating with the indoor space, for example, and the second outlet 51B2 is connected to a duct communicating with the outdoor space, for example. With such a configuration, indoor air (exhaust air) taken into the air handling unit 50 can be discharged to the outdoor space.

Further, the third heat exchanger 52 is disposed at the second duct 51B at a position downstream of the second inlet 51B1 and upstream of the second outlet 51B2. With such a configuration, heat of indoor air (exhaust air) taken into the air handling unit 50 can be transferred to air moving through the first duct 51A and hence, the heat of exhaust air, that is, exhaust heat, can be effectively used. That is, in the refrigeration cycle apparatus 100, the third heat exchanger 52 is disposed at the second duct 51B and hence, it is possible to collect heat from air (exhaust air).

Further, a second heat exchanger 4 is disposed at the second duct 51B at a position downstream of the third heat exchanger 52 and upstream of the second outlet 51B2. With such a configuration, the heat of indoor air (exhaust air) taken into the air handling unit 50 can be applied to refrigerant moving through the second heat exchanger 4 and hence, it is possible to promote evaporation of the refrigerant moving through the second heat exchanger 4. Accordingly, the refrigeration cycle apparatus 100 can improve COP. Even if the refrigeration cycle apparatus 100 does not include the third heat exchanger 52 in its configuration, it is possible to acquire this advantageous effect of improving COP.

The third heat exchanger 52 is disposed at a portion of the first duct 51A between the first inlet 51A1 and the first outlet 51A2. The third heat exchanger 52 is disposed at a portion of the second duct 51B between the second inlet 51B1 and the second outlet 51B2. That is, the third heat exchanger 52 is disposed at an intermediate portion of the first duct 51A, that is, at an intermediate portion of the second duct 51B.

[Refrigerant Circuit RC]

The refrigerant circuit RC circulates refrigerant in the refrigerant circuit RC. It is preferable to adopt R290 refrigerant as refrigerant for the refrigerant circuit RC, for example. However, carbon dioxide refrigerant or R410 refrigerant may be adopted as refrigerant for the refrigerant circuit RC. The refrigerant circuit RC includes the compressor 1, which compresses refrigerant, the first heat exchanger 2, which functions as a condenser, the expansion valve 3, which is formed of an expansion device, and the second heat exchanger 4, which functions as an evaporator.

The first heat exchanger 2 causes the refrigerant to condense by exchanging heat between the refrigerant moving through the refrigerant circuit RC and a heat medium passing through the refrigerant circuit RC. The first heat exchanger 2 is a heat medium-refrigerant heat exchanger that exchanges heat between a heat medium and refrigerant. The first heat exchanger 2 may be formed of a plate type heat exchanger, for example. The second heat exchanger 4 is disposed at the second duct 51B, and causes refrigerant to evaporate by exchanging heat between the refrigerant and air moving through the second duct 51B. The second heat exchanger 4 may be formed of a finned tube heat exchanger, for example.

The refrigerant circuit RC includes a refrigerant pipe RP1, a refrigerant pipe RP2, a refrigerant pipe RP3, and a refrigerant pipe RP4. Each of the refrigerant pipe RP1, the refrigerant pipe RP2, the refrigerant pipe RP3, and the refrigerant pipe RP4 is a pipe having one end and the other end. Each of the refrigerant pipe RP1, the refrigerant pipe RP2, the refrigerant pipe RP3 and the refrigerant pipe RP4 is formed to extend from one end to the other end, thus forming a flow passage through which refrigerant moves.

One end of the refrigerant pipe RP1 is connected to the discharge side of the compressor 1, and the other end of the refrigerant pipe RP1 is connected to a refrigerant inflow part of the first heat exchanger 2. One end of the refrigerant pipe RP2 is connected to a refrigerant outflow part of the first heat exchanger 2, and the other end of the refrigerant pipe RP2 is connected to the expansion valve 3. One end of the refrigerant pipe RP3 is connected to the second heat exchanger 4, and the other end of the refrigerant pipe RP3 is connected to the suction side of the compressor 1.

[Heat medium circuit HC]

The heat medium circuit HC circulates a heat medium in the heat medium circuit HC. Water may be adopted as the heat medium. Antifreeze may also be adopted as the heat medium. Further, mixed liquid of water and antifreeze may also be adopted as the heat medium. The heat medium circuit HC includes the first heat exchanger 2, and the first pump 5A that delivers the heat medium. The heat medium circuit HC is connected to the fourth heat exchanger 7 that heats water in a hot water supply tank 6. In this embodiment 1, the description is made assuming that the refrigeration cycle apparatus 100 does not include the hot water supply tank 6 and the fourth heat exchanger 7 in its configuration. Although not shown in the drawing, the refrigeration cycle apparatus 100 may include the hot water supply tank 6 and the fourth heat exchanger 7.

The first pump 5A includes a first outflow part through which a heat medium flows out from the first pump 5A and a first inflow part through which the heat medium flows into the first pump 5A. One end of the first outflow part is connected to the first heat medium pipe P1 described later, and the other end of the first outflow part is connected to the first heat exchanger 2. With the operation of the first pump 5A, the heat medium is circulated in the heat medium circuit HC.

The heat medium circuit HC includes the first heat medium pipe P1, the second heat medium pipe P2, and the third heat medium pipe P3. The first heat medium pipe P1 connects the first outflow part of the first pump 5A and the first heat exchanger 2 with each other. The second heat medium pipe P2 connects the first heat exchanger 2 and the fourth heat exchanger 7 with each other. The third heat medium pipe P3 connects the fourth heat exchanger 7 and the first inflow part of the first pump 5A with each other.

[Controller Cnt]

The controller Cnt controls the compressor 1, the expansion valve 3, the first fan 53A, the second fan 53B, and the first pump 5A.

Each function part included in the controller Cnt is formed of a dedicated hardware, or a Micro Processing Unit (MPU), which performs a program stored in a memory.

In the case where the controller Cnt is formed of dedicated hardware, the controller Cnt may be a single circuit, a composite circuit, an application specific integrated circuit (ASIC), a field-programmable gate array (FPGA), or a circuit formed by combining such circuits, for example. Each of the respective function parts realized by the controller Cnt may be realized by individual hardware, or each function part may be realized by one hardware.

In the case where the controller Cnt is formed of MPU, respective functions of the controller Cnt are realized by software, firmware, or a combination of the software and the firmware. The software and the firmware are described as a program, and are stored in the memory. MPU reads and performs the program stored in the memory, thus realizing respective functions of the controller Cnt. The memory may be a nonvolatile semiconductor memory or a volatile semiconductor memory, such as a RAM, a ROM, a flash memory, an EPROM, or an EEPROM, for example.

Description of Manner of Operation of Embodiment 1

A water boiling operation of the refrigeration cycle apparatus 100 will be described.

(Water Boiling Operation)

In the refrigerant circuit RC, refrigerant with high temperature and high pressure compressed by the compressor 1 is supplied to the first heat exchanger 2 to exchange heat with a heat medium moving through the first heat exchanger 2. The refrigerant supplied to the first heat exchanger 2 condenses to become high pressure liquid refrigerant. The liquid refrigerant is reduced in pressure by the expansion valve 3. The refrigerant where the pressure is reduced by the expansion valve 3 evaporates in the second heat exchanger 4 disposed at the second duct 51B of the air handling unit 50 to become low pressure gas refrigerant. The gas refrigerant is suctioned by the compressor 1.

In the heat medium circuit HO, the heat medium discharged from the first pump 5A is supplied to the first heat exchanger 2 to exchange heat with refrigerant moving through the first heat exchanger 2. With the heat exchange between the refrigerant and the heat medium in the first heat exchanger 2, the temperature of the heat medium in the first heat exchanger 2 increases. The heat medium passing through the first heat exchanger 2 is supplied to the fourth heat exchanger 7 to exchange heat with water in the hot water supply tank 6, thus decreasing the temperature of the heat medium. The heat medium passing through the fourth heat exchanger 7 is suctioned by the first pump 5A.

(Ventilation Operation)

Next, a ventilation operation of the refrigeration cycle apparatus 100 will be described.

Outdoor air (supply air) is taken into the first duct 51A with the operation of the first fan 53A. Further, indoor air (exhaust air) is taken into the second duct 51B with the operation of the second fan 53B.

The air taken into the first duct 51A and the air taken into the second duct 51B flow into the third heat exchanger 52, which is a total enthalpy heat exchanger. Air in the first duct 51A and air in the second duct 51B exchange heat in the third heat exchanger 52. In the winter, for example, heat of exhaust air flowing into the third heat exchanger 52 through the second duct 51B is applied to supply air flowing into the third heat exchanger 52 through the first duct 51A. With such a configuration, it is possible to increase the temperature of supply air supplied to the indoor space through the first duct 51A of the refrigeration cycle apparatus 100. Accordingly, the refrigeration cycle apparatus 100 can suppress that the temperature of the indoor space is lowered due to the ventilation operation.

In the second duct 51B, air passing through the third heat exchanger 52 passes through the second heat exchanger 4, thus exchanging heat with refrigerant moving through the second heat exchanger 4. In the winter, for example, the temperature of indoor air increases due to heaters or other devices installed in the indoor space. In a process where this indoor air having an increased temperature passes through the third heat exchanger 52, which is a total enthalpy heat exchanger, heat of the air is removed by the third heat exchanger 52. As a result, this indoor air having the increased temperature reduces in temperature. However, even after the temperature is reduced, the temperature of this air is higher than the temperature of outside air and the temperature of the second heat exchanger 4. Accordingly, the air passing through the second heat exchanger 4 can promote evaporation of refrigerant moving through the second heat exchanger 4.

The refrigeration cycle apparatus 100 performs the water boiling operation and the ventilation operation simultaneously, so that COP at the time of boiling water can be improved, and it is possible to exchange indoor air with outdoor air.

Note that the refrigeration cycle apparatus 100 may perform the ventilation operation when the water boiling operation is not performed (when the compressor 1 is in a stopped state). Further, the refrigeration cycle apparatus 100 may perform the water boiling operation when the ventilation operation is not performed (when the first fan 53A and the second fan 53B are in a stopped state).

(Defrosting Operation)

The refrigeration cycle apparatus 100 can also perform a defrosting operation. In performing the defrosting operation, the opening degree of the expansion valve 3 is brought into a fully open state. With such an operation, refrigerant with high temperature and high pressure is supplied to the second heat exchanger 4 via the first heat exchanger 2 and the expansion valve 3, thus melting frost adhering to the second heat exchanger 4.

Advantageous Effect of Refrigeration Cycle Apparatus 100 According to this Embodiment 1

In the refrigeration cycle apparatus 100 according to this embodiment 1, the second heat exchanger 4 is disposed at the second duct 51B, and causes refrigerant to evaporate by exchanging heat between the refrigerant and air moving through the second duct 51B. That is, in the refrigeration cycle apparatus 100, evaporation of the refrigerant moving through the second heat exchanger 4 is promoted by exhaust heat of indoor air having higher temperature than outdoor air. Accordingly, the refrigeration cycle apparatus 100 can improve COP of the refrigerant circuit RC.

Embodiment 2

Figure 2:
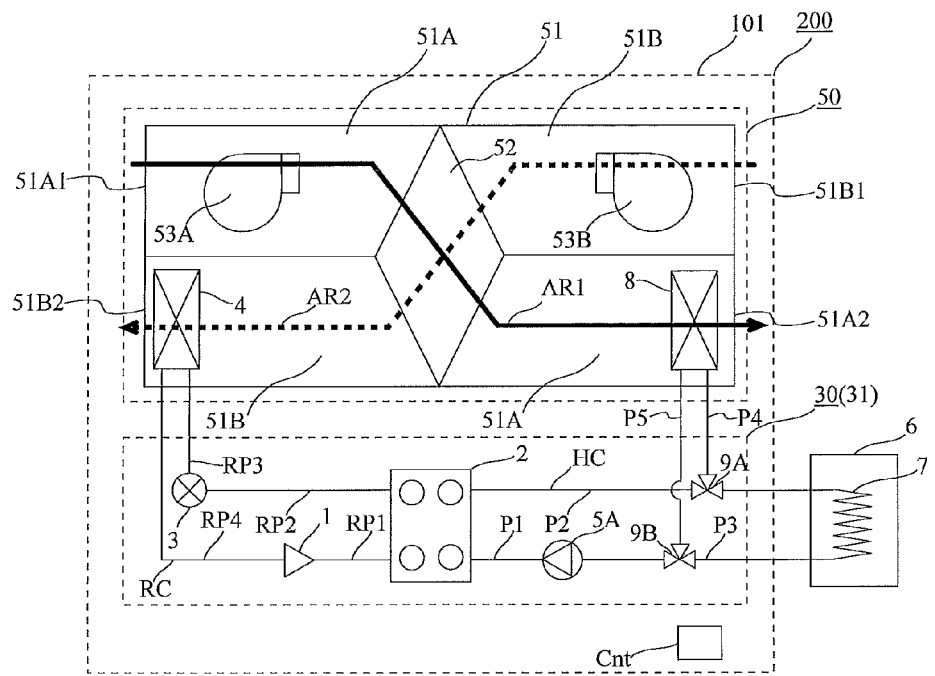
FIG. 2 is a schematic configuration view of a refrigeration cycle apparatus 200 according to Embodiment 2 of the present disclosure.

FIG. 2 is a schematic configuration view of a refrigeration cycle apparatus 200 according to this embodiment 2. In Embodiment 2, the description of content identical to that in Embodiment 1 is omitted, and parts which make this embodiment 2 different from Embodiment 1 are mainly described. The embodiment 2 has a configuration obtained by adding a first flow switching valve 9A, a second flow switching valve 9B, and a fifth heat exchanger 8 to the configuration of Embodiment 1.

The heat medium circuit HC includes the fifth heat exchanger 8, the first flow switching valve 9A, the second flow switching valve 9B, a fourth heat medium pipe P4, and a fifth heat medium pipe P5.

The fifth heat exchanger 8 is disposed at the first duct 51A. The fifth heat exchanger 8 is disposed at the first duct 51A at a position downstream of the third heat exchanger 52. That is, the third heat exchanger 52 is disposed at the first duct 51A at a position downstream of the first inlet 51A1 and upstream of the first outlet 51A2, and the fifth heat exchanger 8 is disposed at the position downstream of the third heat exchanger 52 and upstream of the first outlet 51A2. The fifth heat exchanger 8 may be formed of a finned tube heat exchanger, for example.

Note that the fifth heat exchanger 8 may be disposed at the first duct 51A at a position upstream of the third heat exchanger 52. The fifth heat exchanger 8 is heated with the flowing of a heat medium therethrough, and applies heat to air moving through the first duct 51A. With such a configuration, the temperature of air to be supplied to an indoor space can be increased to a temperature higher than that of cold outside air in an outdoor space, so that it is possible to suppress that the temperature of the indoor space is lowered due to the ventilation operation.

It is preferable to form the fifth heat exchanger 8 such that the flow of a heat medium forms a counter flow of air moving through the first duct 51A. That is, it is preferable to form the fifth heat exchanger 8 such that a heat transfer tube is disposed parallel to the extending direction of the first duct 51A, the upstream side of a flow passage of the heat transfer tube is positioned on the downstream side of the first duct 51A, and the downstream side of the flow passage of the heat transfer tube is positioned on the upstream side of the first duct 51A.

The first flow switching valve 9A is provided to the second heat medium pipe P2. The first flow switching valve 9A forms a first flow passage through which a heat medium moves from the first heat exchanger 2 to the fourth heat exchanger 7, and forms a second flow passage through which a heat medium moves from the first heat exchanger 2 to the fifth heat exchanger 8. Opening/closing of the first flow passage and opening/closing of the second flow passage are controlled by the controller Cnt. The controller Cnt and the first flow switching valve 9A can open both the first flow passage and the second flow passage simultaneously.

Further, the controller Cnt and the first flow switching valve 9A can open either one of the first flow passage and the second flow passage.

The second flow switching valve 9B is provided to the second heat medium pipe P2 or the third heat medium pipe P3. This embodiment 2 shows an example where the second flow switching valve 9B is provided to the third heat medium pipe P3. However, the second flow switching valve 9B may be provided to the second heat medium pipe P2. Even if the second flow switching valve 9B is provided to the second heat medium pipe P2, a heated heat medium can be supplied to the fifth heat exchanger 8.

The second flow switching valve 9B form a fourth flow passage through which a heat medium moves from the fifth heat exchanger 8 to the first pump 5A and a fifth flow passage through which a heat medium moves from the fourth heat exchanger 7 to the first pump 5A. Opening/closing of the fourth flow passage and opening/closing of the fifth flow passage are controlled by the controller Cnt. The controller Cnt and the second flow switching valve 9B can open both the fourth flow passage and the fifth flow passage simultaneously, and can open either one of the fourth flow passage and the fifth flow passage.

The fourth heat medium pipe P4 connects the first flow switching valve 9A and the fifth heat exchanger 8 with each other.

The fifth heat medium pipe P5 connects the second flow switching valve 9B and the fourth heat exchanger 7 with each other.

Description of Manner of Operation of Embodiment 2

The refrigeration cycle apparatus 200 includes the fifth heat exchanger 8 and hence, the refrigeration cycle apparatus 200 can perform the heating operation. The heating operation includes a first heating operation and a second heating operation.
(First Heating Operation)

The manner of operation of the refrigerant circuit RC is substantially equal to that in the water boiling operation described in Embodiment 1.

With respect to the manner of operation of the heat medium circuit HC, the first flow switching valve 9A brings the first flow passage into an open state, and brings the second flow passage into a closed state. Further, the second flow switching valve 9B brings the fourth flow passage into an open state, and brings the fifth flow passage into a closed state. That is, a heat medium is circulated through the first pump 5A, the first heat medium pipe P1, the first heat exchanger 2, the second heat medium pipe P2, the first flow switching valve 9A, the fourth heat medium pipe P4, the fifth heat exchanger 8, the fifth heat medium pipe P5 and the second flow switching valve 9B in this order, and the heat medium returns to the first pump 5A. The heat medium heated by the first heat exchanger 2 is supplied to the fifth heat exchanger 8 to exchange heat with air moving through the first duct 51A, thus heating the air moving through the first duct 51A.

In the first heating operation, a heat medium is not supplied to the fourth heat exchanger 7, so that water in the hot water supply tank 6 is not heated.
(Second Heating Operation)

The manner of operation of the refrigerant circuit RC is substantially equal to that in the water boiling operation described in Embodiment 1.

With respect to the manner of operation of the heat medium circuit HC, the first flow switching valve 9A brings the first flow passage and the second flow passage into an open state. Further, the second flow switching valve 9B brings the fourth flow passage and the fifth flow passage into an open state. That is, a heat medium moves through the first pump 5A, the first heat medium pipe P1, the first heat exchanger 2, the second heat medium pipe P2, and the first flow switching valve 9A in this order. The heat medium flowing into the first flow switching valve 9A is branched into the heat medium moving toward the fifth heat exchanger 8 and the heat medium moving toward the fourth heat exchanger 7. In this embodiment, the heat medium moving toward the fifth heat exchanger 8 is referred to as "portion of the heat medium", and the heat medium moving toward the fourth heat exchanger 7 is referred to as "remaining heat medium". The portion of the heat medium moves through the first flow switching valve 9A, the fourth heat medium pipe P4, the fifth heat exchanger 8, the fifth heat medium pipe P5, and the second flow switching valve 9B in this order. The remaining heat medium moves through the first flow switching valve 9A, the fourth heat exchanger 7, and the second flow switching valve 9B in this order. The portion of the heat medium and the remaining heat medium merge in the second flow switching valve 9B, and return to the first pump 5A.

In the first heating operation, not only air in the first duct 51A is heated, but also water in the hot water supply tank 6 is heated.

In the case where the second heating operation is performed, the controller Cnt can decide whether priority is put on heating of the fifth heat exchanger 8, priority is put on heating of water in the hot water supply tank 6, or priority is put on a balance between the heating of the fifth heat exchanger 8 and the heating of water in the hot water supply tank 6. For example, in the case where the second heating operation is performed, the opening degree of the first flow switching valve 9A and the opening degree of the second flow switching valve 9B can be decided based on temperatures detected by a temperature sensor that detects the temperature of water in the hot water supply tank 6, a temperature sensor that detects the temperature of air blown out from the first duct 51A, a temperature sensor that detects the temperature of air taken into the first duct 51A, and a temperature sensor that detects the temperature in an indoor space. That is, based on the temperatures detected by these temperature sensors, the controller Cnt acquires the amount of the opening degree of the first flow passage, the amount of the opening degree of the second flow passage, the amount of the opening degree of the fourth flow passage, and the amount of the opening degree of the fifth flow passage to control the first flow switching valve 9A and the second flow switching valve 9B.

In the first heating operation and the second heating operation, the first fan 53A is operated. However, the second fan 53B may be or may not be operated. In the first heating operation and the second heating operation, when the second fan 53B is operated, air supplied from the second fan 53B to the second heat exchanger 4 can promote evaporation of refrigerant in the second heat exchanger 4, and can discharge indoor air from an indoor space to an outdoor space.

The refrigeration cycle apparatus 200 can also perform the water boiling operation and the defrosting operation described in Embodiment 1.

Advantageous Effect of Refrigeration Cycle Apparatus 200 According to this Embodiment 2

The refrigeration cycle apparatus 200 according to this embodiment 2 has the following advantageous effect in addition to the advantageous effect of the refrigeration cycle apparatus 100 according to Embodiment 1. That is, the refrigeration cycle apparatus 200 can supply air heated by the fifth heat exchanger 8 to an indoor space by performing at least one of the first heating operation and the second heating operation.

Embodiment 3

Figure 3:
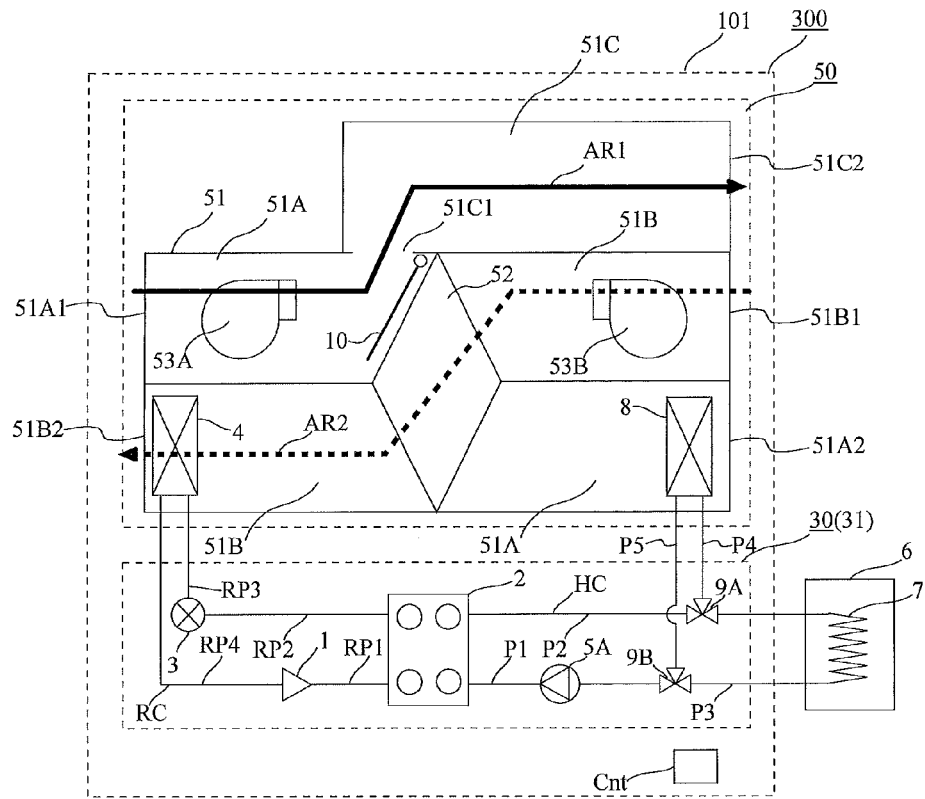
FIG. 3 is a schematic configuration view of a refrigeration cycle apparatus 300 according to Embodiment 3 of the present disclosure.

FIG. 3 is a schematic configuration view of a refrigeration cycle apparatus 300 according to this embodiment 3.

Figure 4:
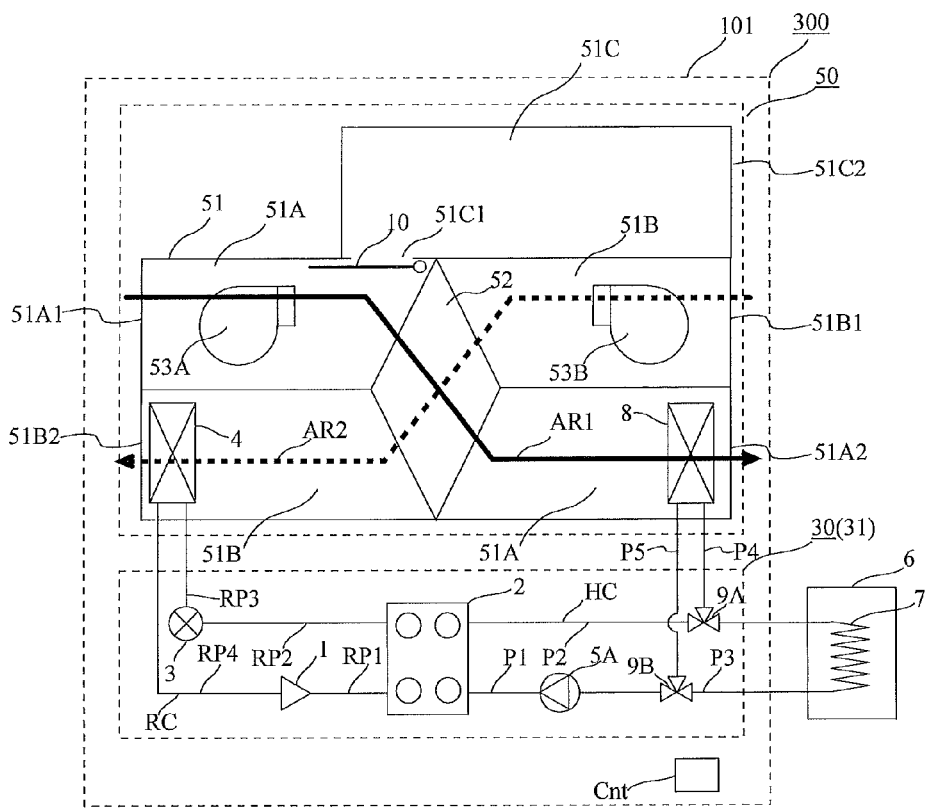
FIG. 4 is a schematic configuration view showing that a damper 10 of the refrigeration cycle apparatus 300 shown in FIG. 3 is switched from a first state shown in FIG. 3 to a second state.

FIG. 4 is a schematic configuration view showing that a damper 10 of the refrigeration cycle apparatus 300 shown in FIG. 3 is switched from a first state shown in FIG. 3 to a second state. In Embodiment 3, the description of content identical to that in Embodiment 1, 2 is omitted, and parts which make this embodiment 3 different from Embodiment 1, 2 are mainly described. The embodiment 3 has a configuration obtained by adding the damper 10 and a third duct 51C to the configuration of Embodiment 2.

The air handling unit 50 of the refrigeration cycle apparatus 300 includes the damper 10 disposed at the first duct 51A, and the third duct 51C branched from the first duct 51A.

The third duct 51C has a third inlet 51C1 communicating with the first duct 51A, and a third outlet 51C2 communicating with an indoor space. Further, the damper 10 is switchable between the first state and the second state. When a damper 51 is in the first state, air moving through the first duct 51A moves from the first duct 51A to the third duct 51C, so that the air moving through the first duct 51A bypasses the third heat exchanger 52. When the damper 10 is in the second state, the third inlet 51C1 is closed by the damper 10, so that air moving through the first duct 51A moves to the third heat exchanger 52. The first state of the damper 10 is shown in FIG. 3, and the second state of the damper 10 is shown in FIG. 4.

Description of Manner of Operation of Embodiment 3

The refrigeration cycle apparatus 300 includes the damper 10 and the third duct 51C and hence, the refrigeration cycle apparatus 300 can perform a free cooling operation.

(Free Cooling Operation)

The free cooling operation is an operation performed when an increase in temperature in an indoor space is desired to be suppressed while power consumption is suppressed.

The refrigeration cycle apparatus 300 includes a temperature sensor that detects the temperature of outside air, and a temperature sensor that detects the temperature in the indoor space. The controller Cnt switches between the first state and the second state of the damper 10 based on the temperatures detected by these temperature sensors.

The controller Cnt determines whether or not the temperature of outside air is lower than the temperature of an indoor space. When the temperature of outside air is lower than the temperature of the indoor space, the controller Cnt switches the damper 10 to the first state. That is, air taken into the air handling unit 50 is supplied to the indoor space through the third duct 51C without causing the air to move to the third heat exchanger 52, which is a total enthalpy heat exchanger. With such a configuration, it is possible to supply outside air having a lower temperature than indoor air to the indoor space.

The refrigeration cycle apparatus 300 may perform the water boiling operation or the defrosting operation simultaneously with the free cooling operation. Further, the refrigeration cycle apparatus 300 performs neither of the first heating operation nor the second heating operation during a period where the free cooling operation is performed.

Advantageous Effect of Refrigeration Cycle Apparatus 300 According to this Embodiment 3

The refrigeration cycle apparatus 300 according to this embodiment 3 has the following advantageous effect in addition to the advantageous effect of the refrigeration cycle apparatus 100 according to the embodiments 1, 2. That is, the refrigeration cycle apparatus 300 can perform the free cooling operation, so that the refrigeration cycle apparatus 300 can suppress an increase in temperature in an indoor space while suppressing power consumption.

The embodiment 3 has the configuration obtained by adding the damper 10 and the third duct 51C to the configuration of Embodiment 2. However, the configuration of Embodiment 3 is not limited to such a configuration. The embodiment 3 may have a configuration obtained by adding the damper 10 and the third duct 51C to the configuration of Embodiment 1.

Embodiment 4

Figure 5:
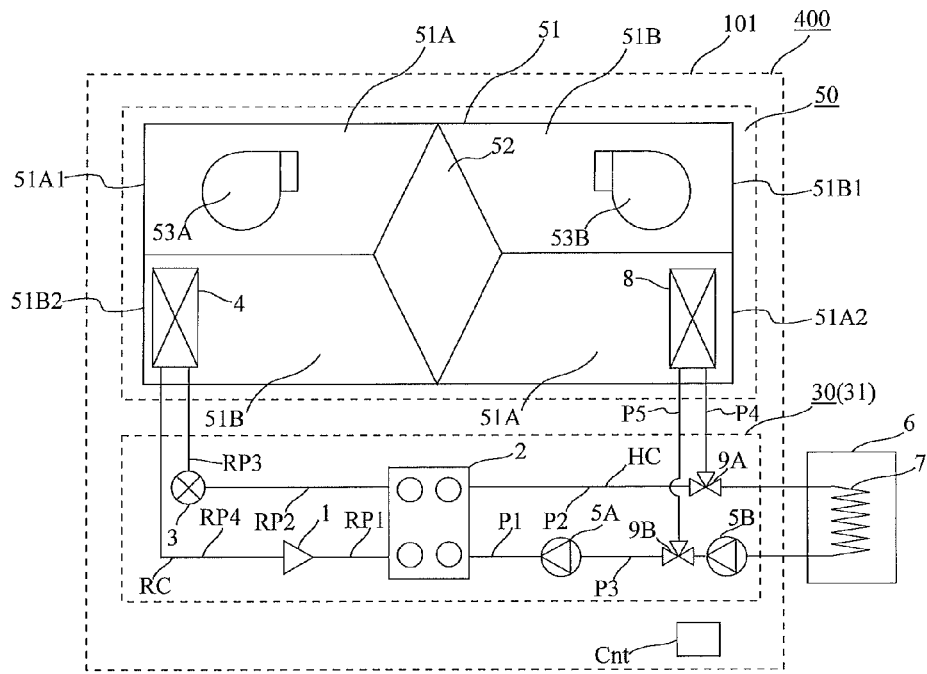
FIG. 5 is a schematic configuration view of a refrigeration cycle apparatus 400 according to Embodiment 4 of the present disclosure.

FIG. 5 is a schematic configuration view of a refrigeration cycle apparatus 400 according to Embodiment 4 of the present disclosure. In Embodiment 4, the description of content identical to that in Embodiment 1 to 3 is omitted, and parts which make this embodiment 4 different from Embodiment 1 to 3 are mainly described. The embodiment 4 has a configuration obtained by adding a second pump 5B to the configuration of Embodiment 2.

The heat medium circuit HC includes the second pump 5B that delivers a heat medium. The second pump 5B is provided to the third heat medium pipe P3. The second pump 5B includes a second outflow part through which a heat medium flows out from the second pump 5B and a second inflow part through which a heat medium flows into the second pump 5B. The second outflow part of the second pump 5B is connected to the second flow switching valve 9B, and the second inflow part of the second pump 5B is connected to the fourth heat exchanger 7.

The first flow switching valve 9A can form a third flow passage through which a heat medium moves from the fifth heat exchanger 8 to the fourth heat exchanger 7 in addition to the first flow passage and the second flow passage.

The second flow switching valve 9B is provided to the third heat medium pipe P3. The second flow switching valve 9B can also form a sixth flow passage through which a heat medium moves from the second pump 5B to the fifth heat exchanger 8 in addition to the fourth flow passage and the fifth flow passage.

Description of Manner of Operation of Embodiment 4

The refrigeration cycle apparatus 400 includes the first flow switching valve 9A, the second flow switching valve 9B, and the second pump 5B and hence, the refrigeration cycle apparatus 400 can perform an exhaust heat recovery heating operation.

(Exhaust Heat Recovery Heating Operation)

The exhaust heat recovery heating operation is a third heating operation that can be performed when frost forms on the second heat exchanger 4. The exhaust heat recovery heating operation may also be performed in place of the first heating operation and the second heating operation in the case where a heating load required for an indoor space is not so significant.

When a difference between a set temperature for the indoor space and a temperature in the indoor space is smaller than a value set in advance, the controller Cnt performs the exhaust heat recovery heating operation, which is the third heating operation. When the difference between the set temperature for the indoor space and a temperature in the indoor space is equal to or more than the value set in advance, the controller Cnt performs the first heating operation or the second heating operation.

In the exhaust heat recovery heating operation, the controller Cnt brings the third flow passage of the first flow switching valve 9A into an open state, and brings the first flow passage and the second flow passage into a closed state. Further, in the exhaust heat recovery heating operation, the controller Cnt brings the sixth flow passage of the second flow switching valve 9B into an open state, and brings the fourth flow passage and the fifth flow passage into a closed state. Further, in the exhaust heat recovery heating operation, the controller Cnt stops the first pump 5A, and operates the second pump 5B. Further, in the exhaust heat recovery heating operation, the controller Cnt operates the first fan 53A.

During the third heating operation, which is the exhaust heat recovery heating operation, the refrigeration cycle apparatus 400 performs none of the water boiling operation, the first heating operation, nor the second heating operation.

During the third heating operation, which is the exhaust heat recovery heating operation, the refrigeration cycle apparatus 400 can perform the defrosting operation simultaneously.

Advantageous Effect of Refrigeration Cycle Apparatus 400 According to this Embodiment 4

The refrigeration cycle apparatus 400 according to this embodiment 4 has the following advantageous effect in addition to the advantageous effect substantially equal to that of Embodiment 2. That is, the refrigeration cycle apparatus 400 includes the first flow switching valve 9A, the second flow switching valve 9B, and the second pump 5B and hence, the refrigeration cycle apparatus 400 can perform the exhaust heat recovery heating operation, so that heated air can be supplied to an indoor space even in the case where frost forms on the second heat exchanger 4. Further, in the case where a heating load required for the indoor space is not so significant, neither of the first heating operation nor the second heating operation is performed, but the third heating operation is performed. In the third heating operation, the total length of the flow passage of the heat medium circuit HC through which the heat medium circulates is shorter than those in the first heating operation and the second heating operation and hence, power consumption of the pump can be suppressed. In addition to the above, in the third heating operation, the compressor 1 is not necessarily operated and hence power consumption of the compressor 1 can be reduced by a corresponding amount.

Modification of Embodiment 4

Figure 6:
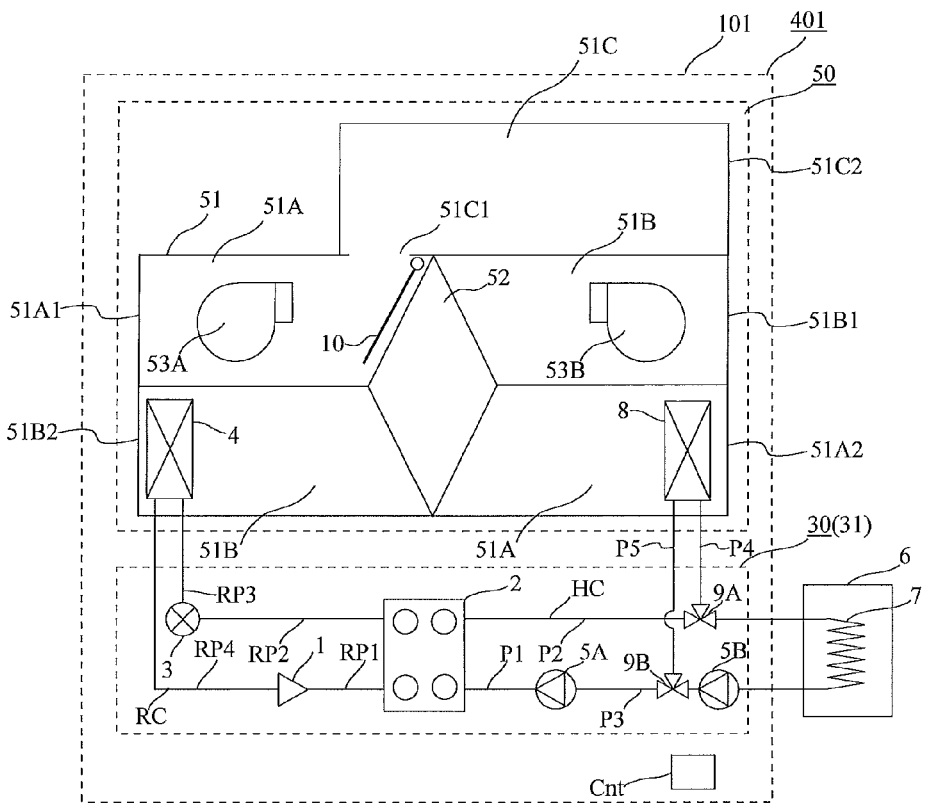
FIG. 6 shows a modification (refrigeration cycle apparatus 401) of Embodiment 4 of the present disclosure.

FIG. 6 shows a modification (refrigeration cycle apparatus 401) of this embodiment 4.

The refrigeration cycle apparatus 401 is a mode obtained by adding the damper 10 and the third duct 51C described in Embodiment 3 to the refrigeration cycle apparatus 400. That is, the refrigeration cycle apparatus 401 is a mode obtained by combining the configuration of Embodiment 3 and the configuration of Embodiment 4. The refrigeration cycle apparatus 401 can acquire the advantageous effect of the refrigeration cycle apparatus 300 according to Embodiment 3 and the advantageous effect of the refrigeration cycle apparatus 400 according to Embodiment 4.

Embodiment 5

Figure 7:
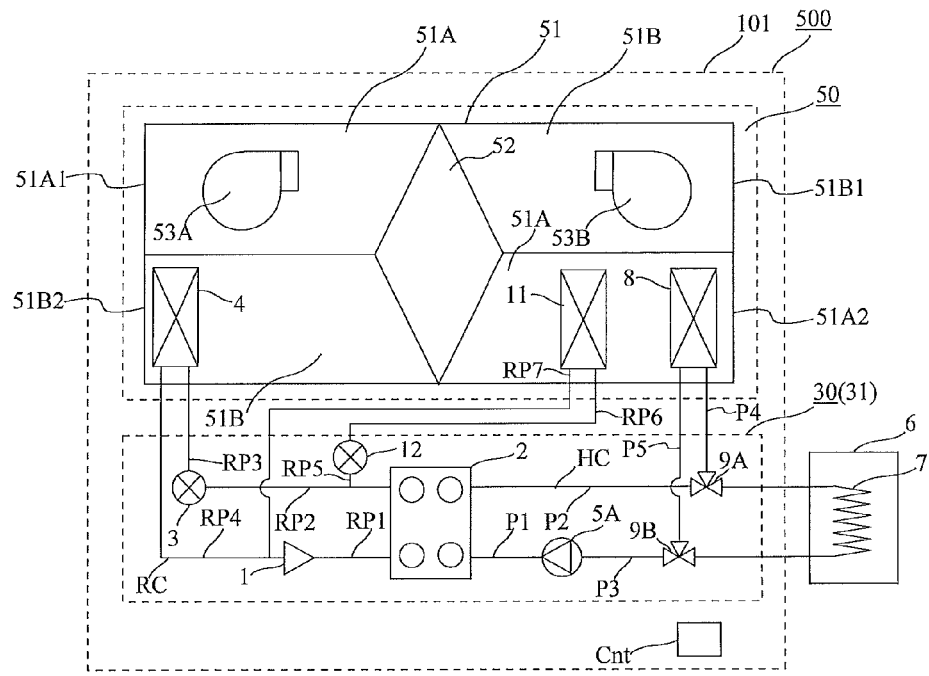
FIG. 7 is a schematic configuration view of a refrigeration cycle apparatus 500 according to Embodiment 5 of the present disclosure.

FIG. 7 is a schematic configuration view of a refrigeration cycle apparatus 500 according to this embodiment 5. In Embodiment 5, the description of content identical to that in Embodiment 1 to 4 is omitted, and parts which make this embodiment 5 different from Embodiment 1 to 4 are mainly described. The embodiment 5 has a configuration obtained by adding a sixth heat exchanger 11 and an expansion valve 12 to the configuration of Embodiment 2.

The refrigerant circuit RC includes the sixth heat exchanger 11 that causes refrigerant to evaporate. The sixth heat exchanger 11 functions as an evaporator. The sixth heat exchanger 11 is a heat exchanger for a cooling operation and a dehumidifying operation. The sixth heat exchanger 11 is disposed at the first duct 51A. The sixth heat exchanger 11 is disposed at the first duct 51A at a position downstream of the third heat exchanger 52 and upstream of the fifth heat exchanger 8. Note that the sixth heat exchanger 11 may be disposed upstream of the third heat exchanger 52.

Further, the refrigerant circuit RC includes a refrigerant pipe RP5, a refrigerant pipe RP6, and a refrigerant pipe RP7. One end of the refrigerant pipe RP5 is connected to the refrigerant pipe RP2, and the other end of the refrigerant pipe RP5 is connected to the expansion valve 12. One end of the refrigerant pipe RP6 is connected to the expansion valve 12, and the other end of the refrigerant pipe RP6 is connected to the sixth heat exchanger 11. One end of the refrigerant pipe RP7 is connected to the sixth heat exchanger 11, and the other end of the refrigerant pipe RP7 is connected to the refrigerant pipe RP4.

The refrigerant circuit RC also includes the expansion valve 12 that reduces the pressure of refrigerant.

The sixth heat exchanger 11 is disposed at the first duct 51A at a position downstream of the third heat exchanger 52 and upstream of the fifth heat exchanger 8.

Description of Manner of Operation of Embodiment 5

The refrigeration cycle apparatus 500 includes the sixth heat exchanger 11 and the expansion valve 12 and hence, the refrigeration cycle apparatus 500 can perform the dehumidifying operation and the cooling operation.

(Dehumidifying Operation)

In the refrigerant circuit RC, refrigerant with high temperature and high pressure compressed by the compressor 1 is supplied to the first heat exchanger 2 to exchange heat with a heat medium moving through the first heat exchanger 2. The refrigerant supplied to the first heat exchanger 2 condenses to become high pressure liquid refrigerant. A part of the liquid refrigerant is reduced in pressure by the expansion valve 12, and evaporates in the sixth heat exchanger 11 to become low pressure gas refrigerant. The remaining liquid refrigerant is reduced in pressure by the expansion valve 3, and evaporates in the second heat exchanger 4 to become low pressure gas refrigerant. The gas refrigerant flowing out from the sixth heat exchanger 11 and the gas refrigerant evaporated in the second heat exchanger 4 merge and, thereafter, are suctioned by the compressor 1.

The manner of operation of the heat medium circuit HC in the dehumidifying operation is substantially equal to that in the first heating operation or in the second heating operation. That is, a heat medium heated by the first heat exchanger 2 is supplied to the fifth heat exchanger 8 through the fourth heat medium pipe P4 and, as a result, air moving through the first duct 51A is heated by the heat medium supplied to the fifth heat exchanger 8.

In the dehumidifying operation, after air taken into the first duct 51A by the action of the first fan 53A flows into the third heat exchanger 52, the air exchanges heat with air moving through the second duct 51B. In the case where an indoor space is cooled by an air conditioner in the summer, for example, air taken into the first duct 51A is cooled by the third heat exchanger 52.

Air passing through the third heat exchanger 52 in the first duct 51A is cooled in a process of passing through the sixth heat exchanger 11 and, as a result, the air passing through the third heat exchanger 52 in the first duct 51A is dehumidified. The air passing through the sixth heat exchanger 11 is cooled and hence, if the air is supplied to the indoor space without any treatment, comfort for person in the indoor space may be impaired. For this reason, air passing through the sixth heat exchanger 11 is supplied to the indoor space after the air is heated by the fifth heat exchanger 8.

(Cooling Operation)

In performing the cooling operation, to prevent a heated heat medium from moving through the fifth heat exchanger 8, the first pump 5A and the second pump 5B are stopped, or the first flow switching valve 9A and the second flow switching valve 9B are controlled. The manner of operation of the refrigerant circuit RC is substantially equal to that in the dehumidifying operation.

Advantageous Effect of Refrigeration Cycle Apparatus 500 According to this Embodiment 5

The refrigeration cycle apparatus 500 according to this embodiment 5 has the following advantageous effect in addition to the advantageous effect substantially equal to that of Embodiment 4. That is, the refrigeration cycle apparatus 500 includes the sixth heat exchanger 11 and hence, the refrigeration cycle apparatus 500 can perform the dehumidifying operation and the cooling operation, thus supplying dehumidified air and cooled air to an indoor space.

Modification 1 of Embodiment 5

Figure 8:
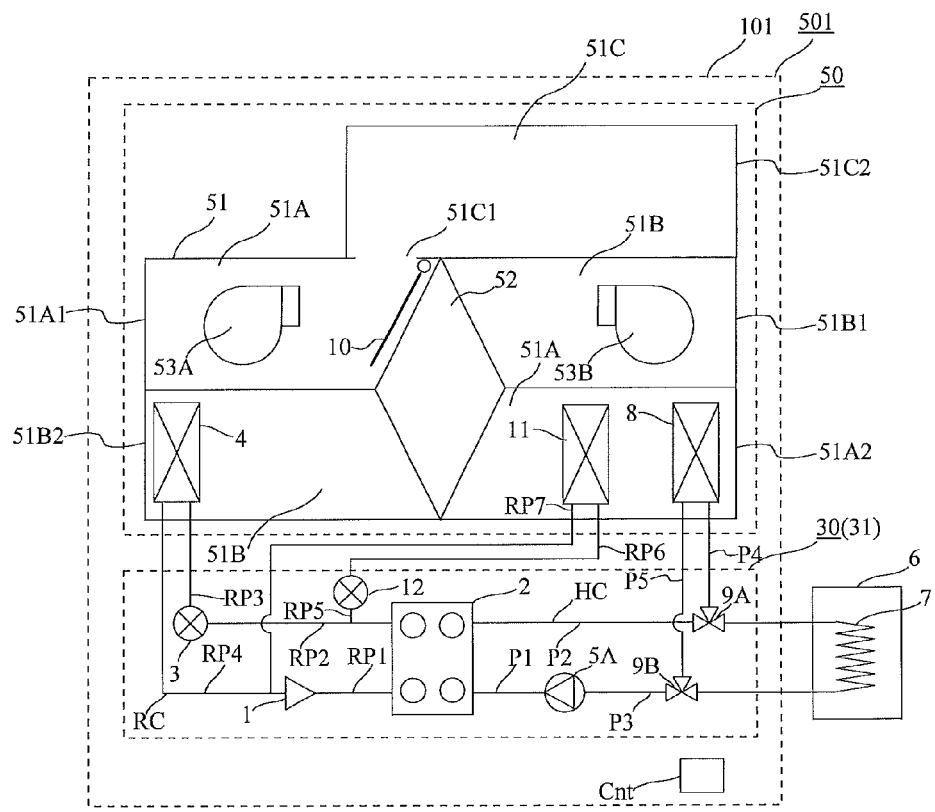
FIG. 8 shows a modification 1 (refrigeration cycle apparatus 501) of Embodiment 5 of the present disclosure.

FIG. 8 shows a modification 1 (refrigeration cycle apparatus 501) of this embodiment 5.

The refrigeration cycle apparatus 501 is a mode obtained by adding the damper 10 and the third duct 51C described in Embodiment 3 to the refrigeration cycle apparatus 500. That is, the refrigeration cycle apparatus 501 is a mode obtained by combining the configuration of Embodiment 5 and the configuration of Embodiment 3.

The refrigeration cycle apparatus 501 can acquire the advantageous effect of the refrigeration cycle apparatus 300 according to Embodiment 3 and the advantageous effect of the refrigeration cycle apparatus 400 according to Embodiment 5.

Modification 2 of Embodiment 5

Figure 9:
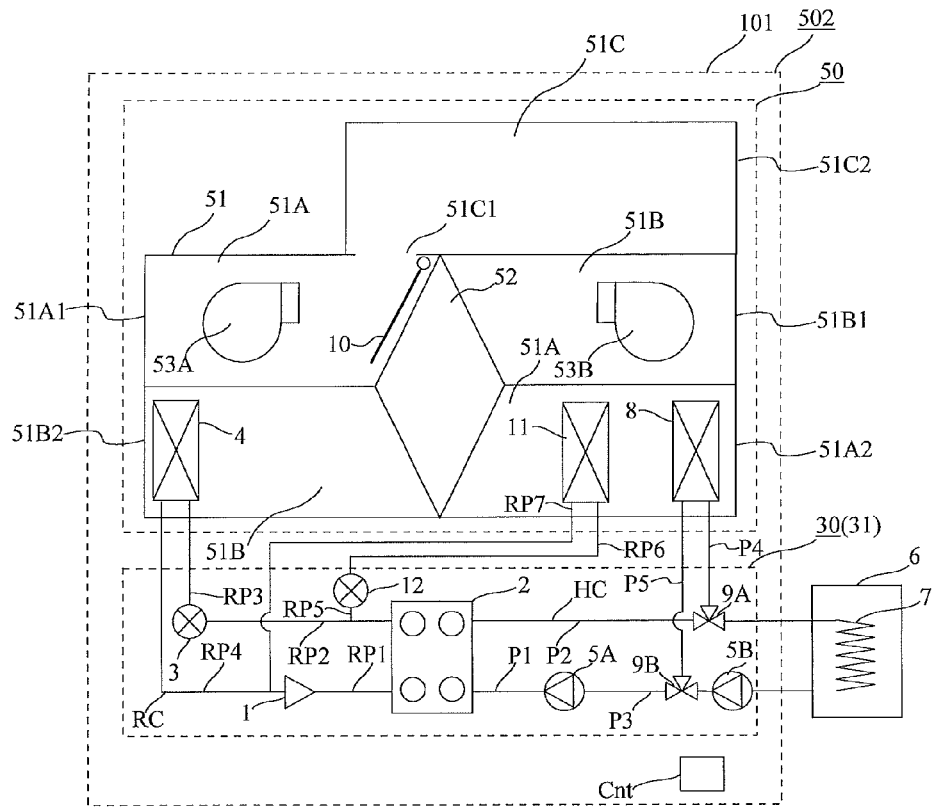
FIG. 9 shows a modification 2 (refrigeration cycle apparatus 502) of Embodiment 5 of the present disclosure.

FIG. 9 shows a modification 2 (refrigeration cycle apparatus 502) of this embodiment 5.

The refrigeration cycle apparatus 502 is a mode obtained by adding the damper 10 and the third duct 51C described in Embodiment 3 and the second pump 5B described in Embodiment 4 to the refrigeration cycle apparatus 500. That is, the refrigeration cycle apparatus 502 is a mode obtained by combining the configuration of Embodiment 5, the configuration of Embodiment 4 and the configuration of Embodiment 3. In the dehumidifying operation in the modification 2, the manner of operation of the heat medium circuit HC is substantially equal to that in the first heating operation, the second heating operation or the third heating operation.

The refrigeration cycle apparatus 502 can acquire the advantageous effect of the refrigeration cycle apparatus 300 according to Embodiment 3, the advantageous effect of the refrigeration cycle apparatus 400 according to Embodiment 4, and the advantageous effect of the refrigeration cycle apparatus 400 according to Embodiment 5.

Modification 3 of Embodiment 5

The refrigeration cycle apparatus according to a modification 3 may be configured by adding the second pump 5B described in Embodiment 4 to the refrigeration cycle apparatus 500. The refrigeration cycle apparatus according to the modification 3 can acquire the advantageous effect of the refrigeration cycle apparatus 400 according to Embodiment 4 and the advantageous effect of the refrigeration cycle apparatus 400 according to Embodiment 5.

The embodiment 5 is a mode obtained on the premise of including the fifth heat exchanger 8. However, Embodiment 5 is not limited to such a mode. The embodiment 5 may have a configuration obtained by adding the sixth heat exchanger 11 and the expansion valve 12 to the configuration of Embodiment 1. That is, the fifth heat exchanger 8 may not be provided.

Embodiment 6

Figure 10:
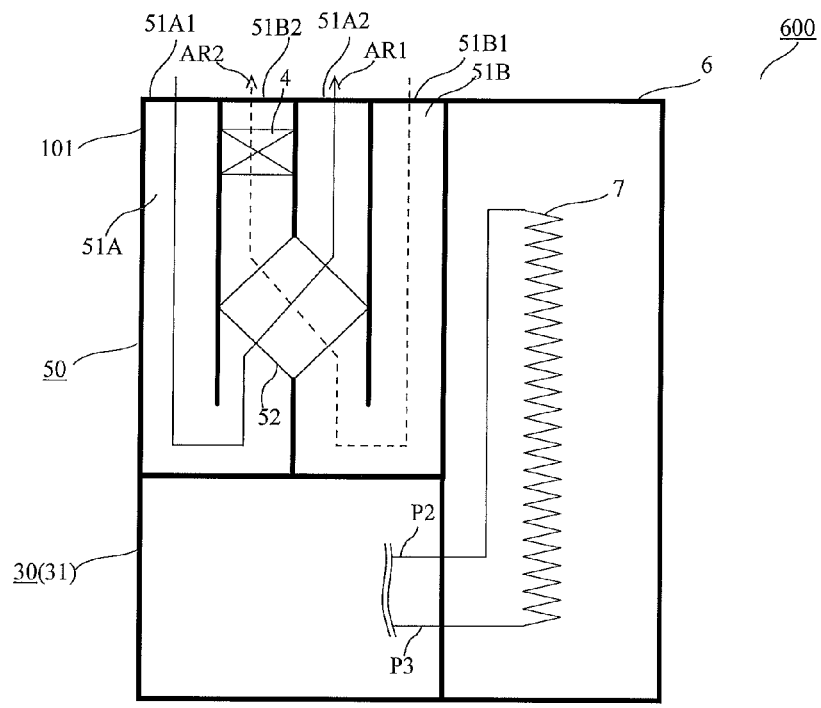
FIG. 10 is a schematic configuration view of a refrigeration cycle apparatus 600 according to Embodiment 6 of the present disclosure.

FIG. 10 is a schematic configuration view of a refrigeration cycle apparatus 600 according to this embodiment 6.

In this embodiment 6, the description of content identical to that in Embodiment 1 to 5 is omitted, and parts which make this embodiment 6 different from Embodiment 1 to 5 are mainly described. In Embodiment 6, the air handling unit 50, the machine chamber unit 30, and the hot water supply tank 6 are formed into an integral body. In FIG. 10, for the sake of convenience, the illustration of the configuration of the refrigerant circuit RC, the controller Cnt, the first fan 53A, and the second fan 53B is omitted.

In this embodiment 6, the air handling unit 50 is disposed on the machine chamber unit 30. Further, the hot water supply tank 6 is disposed beside the machine chamber unit 30 and the air handling unit 50 in an adjacent manner.

In this embodiment 6, the description has been made on the premise of the configuration of the refrigeration cycle apparatus 100 of Embodiment 1. However, Embodiment 6 is not limited to such a configuration. The configuration of Embodiment 6 is also applicable to Embodiment 2 to 5, the modification of Embodiment 4, and the modifications 1 to 3 of Embodiment 5 in the same manner.

Advantageous Effect of Refrigeration Cycle
Apparatus 600 According to this Embodiment 6

In the refrigeration cycle apparatus 600 according to this embodiment 6, the air handling unit 50, the machine chamber unit 30, and the hot water supply tank 6 are formed into an integral body. Accordingly, the refrigeration cycle apparatus 600 can be formed into a compact shape by a corresponding amount.

REFERENCE SIGNS LIST

1: compressor, 2: first heat exchanger, 3: expansion valve, 4: second heat exchanger, 5A: first pump, 5B: second pump, 6: hot water supply tank, 7: fourth heat exchanger, 8: fifth heat exchanger, 9A: first flow switching valve, 9B: second flow switching valve, 10: damper, 11: sixth heat exchanger, 12: expansion valve, 30: machine chamber unit, 31: second casing, 50: air handling unit, 51: third casing, 51A: first duct, 51A1: first inlet, 51A2: first outlet, 51B: second duct, 51B1: second inlet, 51B2: second outlet, 51C: third duct, 51C1: third inlet, 51C2: third outlet, 52: third heat exchanger, 53A: first fan, 53B: second fan, 100: refrigeration cycle apparatus, 101: first casing, 200: refrigeration cycle apparatus, 300: refrigeration cycle apparatus, 400: refrigeration cycle apparatus, 401: refrigeration cycle apparatus, 500: refrigeration cycle apparatus, 501: refrigeration cycle apparatus, 502: refrigeration cycle apparatus, 600: refrigeration cycle apparatus, Cnt: controller, HC: heat medium circuit, P1: first heat medium pipe, P2: second heat medium pipe, P3: third heat medium pipe, P4: fourth heat medium pipe, P5: fifth heat medium pipe, RC: refrigerant circuit, RP1: refrigerant pipe, RP2: refrigerant pipe, RP3: refrigerant pipe, RP4: refrigerant pipe, RP5: refrigerant pipe, RP6: refrigerant pipe, RP7: refrigerant pipe.

The invention claimed is:

1. A refrigeration cycle apparatus comprising:
a casing;
an air handling unit accommodated in the casing, the air handling unit including
a first duct having
a first inlet communicating with an outdoor space, and
a first outlet communicating with an indoor space,
a second duct having
a second inlet communicating with the indoor space, and
a second outlet communicating with the outdoor space,
a first fan configured to force air to move from the first inlet to the first outlet through the first duct,
a second fan configured to force air to move from the second inlet to the second outlet through the second duct,
a third heat exchanger connected to the first duct and the second duct and configured to perform total enthalpy heat exchange between the air moving through the first duct and the air moving through the second duct,
a damper disposed at the first duct, and
a third duct configured to branch from the first duct; and
a refrigerant circuit configured to circulate refrigerant in the refrigerant circuit and including
a first heat exchanger configured to cause the refrigerant to condense by exchanging heat between the refrigerant and a heat medium, and
a second heat exchanger disposed in the second duct and configured to cause the refrigerant to evaporate by exchanging heat between the refrigerant and the air moving through the second duct, wherein:
the third duct has
a third inlet communicating with the first duct, and
a third outlet communicating with the indoor space,
the damper is capable of switching between
a first state where air moving through the first duct moves from the first duct to the third duct so that the air moving through the first duct bypasses the third heat exchanger, and
a second state where the air moving through the first duct moves to the third heat exchanger, and the third inlet is closed,
the refrigeration cycle apparatus further comprises
a heat medium circuit configured to circulate the heat medium in the heat medium circuit and including the first heat exchanger, and
a first pump configured to deliver the heat medium,
the heat medium circuit is connected to a fourth heat exchanger configured to heat water in a hot water supply tank,
the first pump includes
a first outflow part through which the heat medium flows out from the first pump and
a first inflow part through which the heat medium flows into the first pump,
the heat medium circuit includes
a first heat medium pipe configured to connect the first outflow part of the first pump and the first heat exchanger with each other,
a second heat medium pipe configured to connect the first heat exchanger and the fourth heat exchanger with each other,
a third heat medium pipe configured to connect the fourth heat exchanger and the first inflow part of the first pump with each other,
a fifth heat exchanger disposed at the first duct,
a first flow switching valve provided to the second heat medium pipe and forming a first flow passage and a second flow passage, the heat medium moving from the first heat exchanger to the fourth heat exchanger through the first flow passage, the heat medium moving from the first heat exchanger to the fifth heat exchanger through the second flow passage,
a second flow switching valve provided to the second heat medium pipe or the third heat medium pipe and forming a fourth flow passage and a fifth flow passage, the heat medium moving from the fifth heat exchanger to the first pump through the fourth flow passage, the heat medium moving from the fourth heat exchanger to the first pump through the fifth flow passage,
a fourth heat medium pipe configured to connect the first flow switching valve and the fifth heat exchanger with each other, and
a fifth heat medium pipe configured to connect the second flow switching valve and the fifth heat exchanger with each other,
the first duct has
the first inlet at a position on the first duct on a most upstream side in a direction of an air flow, and
the first outlet at a position on the first duct on a most downstream side in the direction of the air flow,
the third heat exchanger is disposed at a position downstream of the first inlet and upstream of the first outlet, the fifth heat exchanger is disposed at a position downstream of the third heat exchanger and upstream of the first outlet,
the heat medium circuit further includes a second pump configured to deliver the heat medium,
the first flow switching valve forms a third flow passage through which the heat medium moves from the fifth heat exchanger to the fourth heat exchanger,
the second flow switching valve is provided to the third heat medium pipe, and forms a sixth flow passage through which the heat medium moves from the second pump to the fifth heat exchanger,
the second pump is provided to the third heat medium pipe, and includes
 a second outflow part through which the heat medium flows out from the second pump and
 a second inflow part through which the heat medium flows into the second pump,
the second outflow part is connected to the second flow switching valve, and
the second inflow part is connected to the fourth heat exchanger.

2. The refrigeration cycle apparatus of claim 1, wherein the refrigerant circuit is accommodated in the casing.

3. The refrigeration cycle apparatus of claim 1, wherein the second duct has
 the second inlet at a position on the second duct on a most upstream side in a direction of an air flow, and
 the second outlet at a position on the second duct on a most downstream side in the direction of the air flow,
the third heat exchanger is disposed at a position downstream of the second inlet and upstream of the second outlet, and
the second heat exchanger is disposed at a position downstream of the third heat exchanger and upstream of the second outlet.

4. The refrigeration cycle apparatus of claim 1, wherein:
the third outlet of the third duct communicates with the indoor space separately from the first outlet of the first duct and from the second inlet of the second duct.

5. The refrigeration cycle apparatus of claim 1, wherein:
the refrigerant circuit further includes a sixth heat exchanger configured to cause the refrigerant to evaporate, and
the sixth heat exchanger is disposed at the first duct at a position downstream of the third heat exchanger and upstream of the fifth heat exchanger.

6. A refrigeration cycle apparatus comprising:
a casing;
an air handling unit accommodated in the casing, the air handling unit including
 a first duct having
  a first inlet communicating with an outdoor space, and
  a first outlet communicating with an indoor space,
 a second duct having
  a second inlet communicating with the indoor space, and
  a second outlet communicating with the outdoor space,
 a first fan configured to force air to move from the first inlet to the first outlet through the first duct,
 a second fan configured to force air to move from the second inlet to the second outlet through the second duct,
 a third heat exchanger connected to the first duct and the second duct and configured to perform total enthalpy heat exchange between the air moving through the first duct and the air moving through the second duct,
 a damper disposed at the first duct, and
 a third duct configured to branch from the first duct; and
a refrigerant circuit configured to circulate refrigerant in the refrigerant circuit and including
 a first heat exchanger configured to cause the refrigerant to condense by exchanging heat between the refrigerant and a heat medium, and
 a second heat exchanger disposed in the second duct and configured to cause the refrigerant to evaporate by exchanging heat between the refrigerant and the air moving through the second duct, wherein:
the third duct has
 a third inlet communicating with the first duct, and
 a third outlet communicating with the indoor space,
the damper is capable of switching between
 a first state where air moving through the first duct moves from the first duct to the third duct so that the air moving through the first duct bypasses the third heat exchanger, and
 a second state where the air moving through the first duct moves to the third heat exchanger, and the third inlet is closed,
the refrigeration cycle apparatus further comprises
 a heat medium circuit configured to circulate the heat medium in the heat medium circuit and including the first heat exchanger, and
 a first pump configured to deliver the heat medium,
the heat medium circuit is connected to a fourth heat exchanger configured to heat water in a hot water supply tank,
the first pump includes
 a first outflow part through which the heat medium flows out from the first pump an
 a first inflow part through which the heat medium flows into the first pump,
the heat medium circuit includes
 a first heat medium pipe configured to connect the first outflow part of the first pump and the first heat exchanger with each other,
 a second heat medium pipe configured to connect the first heat exchanger and the fourth heat exchanger with each other,
 a third heat medium pipe configured to connect the fourth heat exchanger and the first inflow part of the first pump with each other,
 a fifth heat exchanger disposed at the first duct,
 a first flow switching valve provided to the second heat medium pipe and forming a first flow passage and a second flow passage, the heat medium moving from the first heat exchanger to the fourth heat exchanger through the first flow passage, the heat medium moving from the first heat exchanger to the fifth heat exchanger through the second flow passage,
 a second flow switching valve provided to the second heat medium pipe or the third heat medium pipe and forming a fourth flow passage and a fifth flow passage, the heat medium moving from the fifth heat exchanger to the first pump through the fourth flow passage, the heat medium moving from the fourth heat exchanger to the first pump through the fifth flow passage,
 a fourth heat medium pipe configured to connect the first flow switching valve and the fifth heat exchanger with each other, and a fifth heat medium pipe configured to connect the second flow switching valve and the fifth heat exchanger with each other, the first duct has
- the first inlet at a position on the first duct on a most upstream side in a direction of an air flow, and
- the first outlet at a position on the first duct on a most downstream side in the direction of the air flow, the third heat exchanger is disposed at a position downstream of the first inlet and upstream of the first outlet, the fifth heat exchanger is disposed at a position downstream of the third heat exchanger and upstream of the first outlet, the refrigerant circuit further includes a sixth heat exchanger configured to cause the refrigerant to evaporate, and the sixth heat exchanger is disposed at the first duct at a position downstream of the third heat exchanger and upstream of the fifth heat exchanger.

7. The refrigeration cycle apparatus of claim 6, wherein the refrigerant circuit is accommodated in the casing.

8. The refrigeration cycle apparatus of claim 6, wherein the second duct has
- the second inlet at a position on the second duct on a most upstream side in a direction of an air flow, and
- the second outlet at a position on the second duct on a most downstream side in the direction of the air flow, the third heat exchanger is disposed at a position downstream of the second inlet and upstream of the second outlet, and the second heat exchanger is disposed at a position downstream of the third heat exchanger and upstream of the second outlet.

9. The refrigeration cycle apparatus of claim 6, wherein the third outlet of the third duct communicates with the indoor space separately from the first outlet of the first duct and from the second inlet of the second duct.

* * * * *